United States Patent [19]

Krauss

[11] Patent Number: 4,917,223
[45] Date of Patent: Apr. 17, 1990

[54] BRAKE FOR A WHEEL

[76] Inventor: Walter Krauss, Gustav-Stresemann-Strasse 3, 8860 Nördlingen, Fed. Rep. of Germany

[21] Appl. No.: 177,621

[22] Filed: Apr. 5, 1988

[30] Foreign Application Priority Data

Apr. 29, 1987 [DE] Fed. Rep. of Germany ....... 3714275

[51] Int. Cl.⁴ ............................................. F16D 51/10
[52] U.S. Cl. .................................... 188/335; 188/365; 192/76
[58] Field of Search ............. 188/335, 365, 76, 73.32, 188/74, 73.39; 192/73, 76

[56] References Cited

U.S. PATENT DOCUMENTS

| | | | |
|---|---|---|---|
| 1,670,320 | 5/1928 | Thompson | 188/218 R |
| 1,918,286 | 7/1933 | Pearmain | 192/76 |
| 2,857,031 | 10/1958 | Fawick | 188/365 X |
| 2,927,822 | 3/1960 | Rabe | 188/218 X |
| 3,042,152 | 7/1962 | Butler | 188/73.32 |
| 3,330,385 | 7/1967 | Swift | 188/73.39 X |
| 4,480,725 | 11/1984 | Brimard | 188/365 X |

FOREIGN PATENT DOCUMENTS

| | | | |
|---|---|---|---|
| 2253400 | 6/1975 | France . | |
| 2545896 | 11/1984 | France | 188/76 |
| 914686 | 1/1963 | United Kingdom | 188/73.32 |
| 1026132 | 4/1966 | United Kingdom | 188/74 |
| 1572744 | 8/1980 | United Kingdom | 188/335 |

Primary Examiner—George E. A. Halvosa
Attorney, Agent, or Firm—Edwin D. Schindler

[57] ABSTRACT

A brake arrangement is disclosed which includes a wheel support, a wheel borne by the wheel support, a brake drum, at least one brake guide saddle arranged in the brake drum so as to bear against the wheel support, a fluid drive piston arranged in a bore in the guide saddle, the guide saddle having guide lugs extending in a direction parallel to the direction of the bore, the guide lugs delimiting a channel in the peripheral direction, and a brake element placed in the channel so that it may be driven by the piston. In order to improve serviceability and to ensure a long useful life, the at least one brake guide saddle is separate from the wheel support. Retainer elements are provided, which are accessible from the inner side of the wheel, and are detachably connecting the guide saddle with the wheel support; and at their longitudinal sides, the guide lugs, each delimiting such guide channel are bridged over at their longitudinal sides by ribs delimiting the guide channel at the end. Such ribs are detachably secured by retainer elements accessible from the inner side of the wheel, and on the inner side of the wheel, each brake element has a grip bar encompassed by the respective rib.

12 Claims, 4 Drawing Sheets

BRAKE FOR A WHEEL

BACKGROUND OF THE INVENTION

The present invention relates to a brake for a wheel mounted on an associated wheel support and more particularly to a vehicle wheel, comprising a brake drum and at least one brake guide saddle in the drum, which saddle is supported on the support and has a bore for a piston arranged to be operated by a fluid under pressure and guide lugs projecting in a direction parallel to the axis of the bore, such lugs delimiting at least one guide channel in the peripheral direction of the wheel in order to receive a respective brake element which is able to be displaced by the piston and preferably consists of a brake pad and a carrier plate.

An arrangement of this type has been previously proposed in the French patent No. 2,253,400 (Application No. 73 43204), in the case of which the two lateral brake guide saddles are part of the wheel support casting. This integral construction however is not easy to service, since if any repair should prove necessary near one brake guide saddle it is necessary to detach the brake drum in any event. If a brake guide saddle becomes unserviceable and has to be replaced it is then necessary for practically the entire wheel support to be replaced. Added to this there is the feature in the known arrangement that the guide lugs formed on the respective brake guide saddles are in the form of cantilever supports which are not joined together outside guide saddle block. The guide channel receiving the respective associated brake element in the brake guide saddle is in this case open at its end. The result of this may be that the brake element may drift towards the wheel axis and this may have an undesired effect on the functional reliability and length of life of the arrangement. However, a particular disadvantage is that owing to the absence of a terminal connection of the two guide lugs when braking takes place it is only the guide lug which is to the front in terms of the direction of rotation of the wheel which bears the load, while the guide lug which is to the rear in terms of the direction of rotation is practically free of load. The outcome of this is an extremely uneven load on the two guide lugs and this is also hardly conducive to the reliability of operation and length of life of the arrangement.

SHORT SUMMARY OF THE INVENTION

Taking this state of the art into account one object of the present invention is to improve an arrangement of the initially mentioned type so that only by the use of simple and cheap means it is possible to ensure relatively high serviceability.

A further aim of the invention is to make the brake simpler to assemble.

A still further object of the invention is to ensure reliable operation and a long length of life.

In order to achieve these or other objects appearing in the present specification and claims in the invention each brake guide saddle forms a component separate from the wheel support and is able to be detachably connected with it by retaining elements which are accessible from the inner side of the wheel, and at their longitudinal sides the guide lugs each delimiting one respective guide channel are bridged over at the longitudinal side by ribs delimiting the guide channel at the end, such ribs being detachably secured by retainer elements accessible from the inner side of the wheel, and on the inner side of the wheel each brake element has a grip bar encompassed by the respective rib.

These features make it possible to completely remedy the disadvantages listed above of the known arrangement. The step forward able to be obtained with the invention is thus to be seen as residing more especially in avoiding the disadvantages of the known arrangement. Since the brake guide saddle or guide saddles are no longer formed on the wheel support and instead may be attached to it, there are comparatively small assembly units, which when required may be replaced en bloc in simple manner. Since the guide lugs are bridged over by lateral ribs there is the advantage that there is practically a surrounding frame encompassing the respectively associated brake element so that on the one hand there is a guiding action on all sides of the brake element and on the other hand there is a mutual stiffening and reinforcement of the two guide lugs. Owing to the removability of the ribs simple replacement of the brake element is nevertheless possible. For this purpose all that is required is to remove the respective internally located rib. Since the corresponding retainer elements are accessible from the inner side of the wheel, it is possible for the brake drum to remain in place as an additional advantage. This will be seen also to apply for the replacement of the entire brake guide saddle. The lateral gripping bar respectively provided adjacent to the brake elements makes the arrangement particularly simple to handle when it comes to replacing a brake element.

In accordance with an advantageous further development of the invention it is possible for the brake guide saddle to be connected with the wheel support by means of a retainer plate which is mounted on the inner side of the wheel and may be secured detachably to the wheel support and the brake guide saddle. The use of such a retainer plate bridging over the joint gap between the brake guide saddle and the wheel support not only leads to a high degree of stability but also to a very simple design as compared with the use of integral retainer cheeks and furthermore leads to an advantageous way of replacing a brake guide saddle.

A further advantageous development is possible in accordance with which the grip bar, preferably formed on the support plate of the brake element is provided with a hole which may practically function as an eye facilitating handling.

In accordance with a further development of the invention it is possible for the brake drum to be shut off (clear off the wheel support and the saddle arrangement thereon) by sheet metal covers in the form of segments of circles and which are able to be detachably secured to the wheel support. The latter with the brake guide saddle mounted thereon then practically form a beam extending through the brake drum, which is flanked on both sides by the sheet metal covers. The latter may thus remain in place when a brake pad or a brake guide saddle is replaced, this facilitating assembly. Nevertheless the interior space in the brake drum is practically completely shut off.

In accordance with a further advantageous measure of the invention the brake drum is provided with ventilating holes arranged at its periphery in such a manner that they are in rows like chevrons aligned along the periphery. This arrangement of the holes ensures that when braking takes place there are no lateral forces on the brake elements. In fact the lateral frces cancel each other out. There is thus the advantage that the lateral connecting ribs are not additionally loaded.

Further advantageous features and convenient developments of the invention will be seen from the claims.

A preferred working example of the invention will now be described in detail with reference to the drawings.

LIST OF THE SEVERAL VIEWS OF THE DRAWINGS

DETAILED ACCOUNT OF WORKING EMBODIMENT OF THE INVENTION

Figure 1:
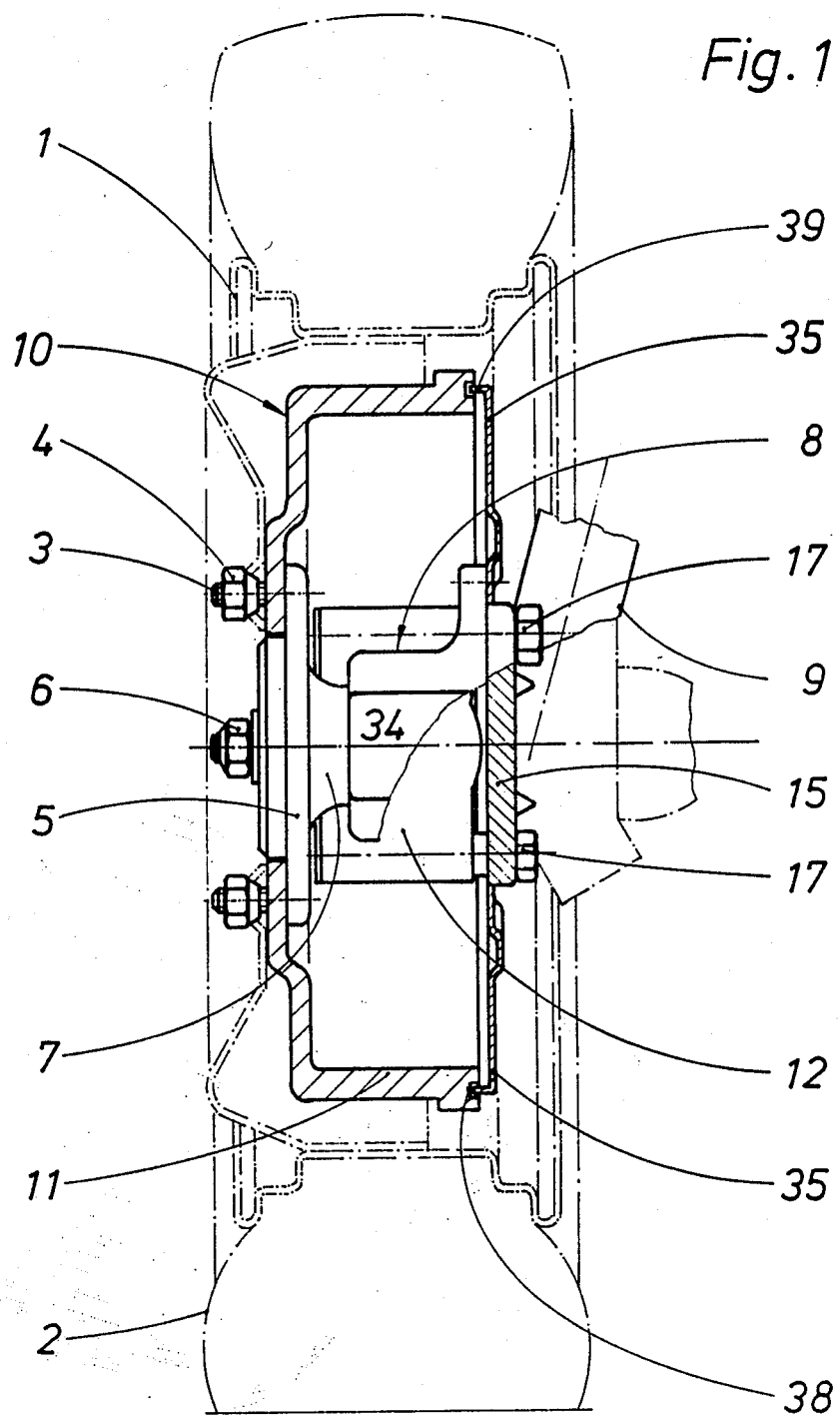
FIG. 1 is a diagrammatic and partly sectioned view of a motor vehicle wheel connected with the wheel suspension system.

The wheel indicated in broken lines in FIG. 1 comprises a rim 1 and a tire 2 mounted thereon. The wheel rim 1 is attached in a conventional manner by wheel bolts 3 and held in place by wheel nuts 4 screwed onto them. The wheel bolts 3 are attached to a support flange 5 which is held on the wheel axle 7 by means of a nut 6. The wheel axle 7 is bearinged in a housing-like wheel support 8 which is connected with the vehicle chassis by means of suitable links 9. Within the rim 1 there is a brake drum 10 which in this case is also connected by the wheel bolts 3 with the support flange 5 and whose peripheral drum casing 11 surrounds the wheel support 8.

In order to produce a braking effect there are brake elements able to be brought into engagement with the inner peripheral surface of the drum casing 11 and which are each mounted on a brake guide saddle 12 which is stationary in relation to the brake drum 10 turning with the wheel and mounted on the wheel support 8 fixed in relation to the chassis. As may best be seen from FIG. 2 there are in the present example of the invention two mutually opposite brake guide saddles 12 arranged at the same level, which are each equipped with a brake element consisting of a support plate 13 and brake pad 14, such element being able to be brought into engagement with the brake drum 10. The brake guide saddles 12 are designed as component separate from the wheel support 8 and are detachably connected with the wheel support 8. To this end the wheel support 8 may be provided with cheeks on it on which a respective brake guide saddle 12 is able to be secured and vice versa. In the design illustrated there, see the right halves of FIGS. 1 and 2, there are separate retainer plates 15 which bridge over the joint gap between the wheel support 8 and the respectively associated brake guide saddle 12 and are able to be secured to bearer surfaces 16 of the wheel support 8 and of the respectively associated brake guide saddle 12. To hole the retainer plates 15 there are, as may further be seen from FIGS. 1 and 2, attachment screws 17 accessible from the inner side of the wheel and whose heads engage the respectively associated retainer plate while the shanks of the screws are received in respective tapped holes in the wheel support 8 and in the associated brake guide saddle 12.

Figure 2:
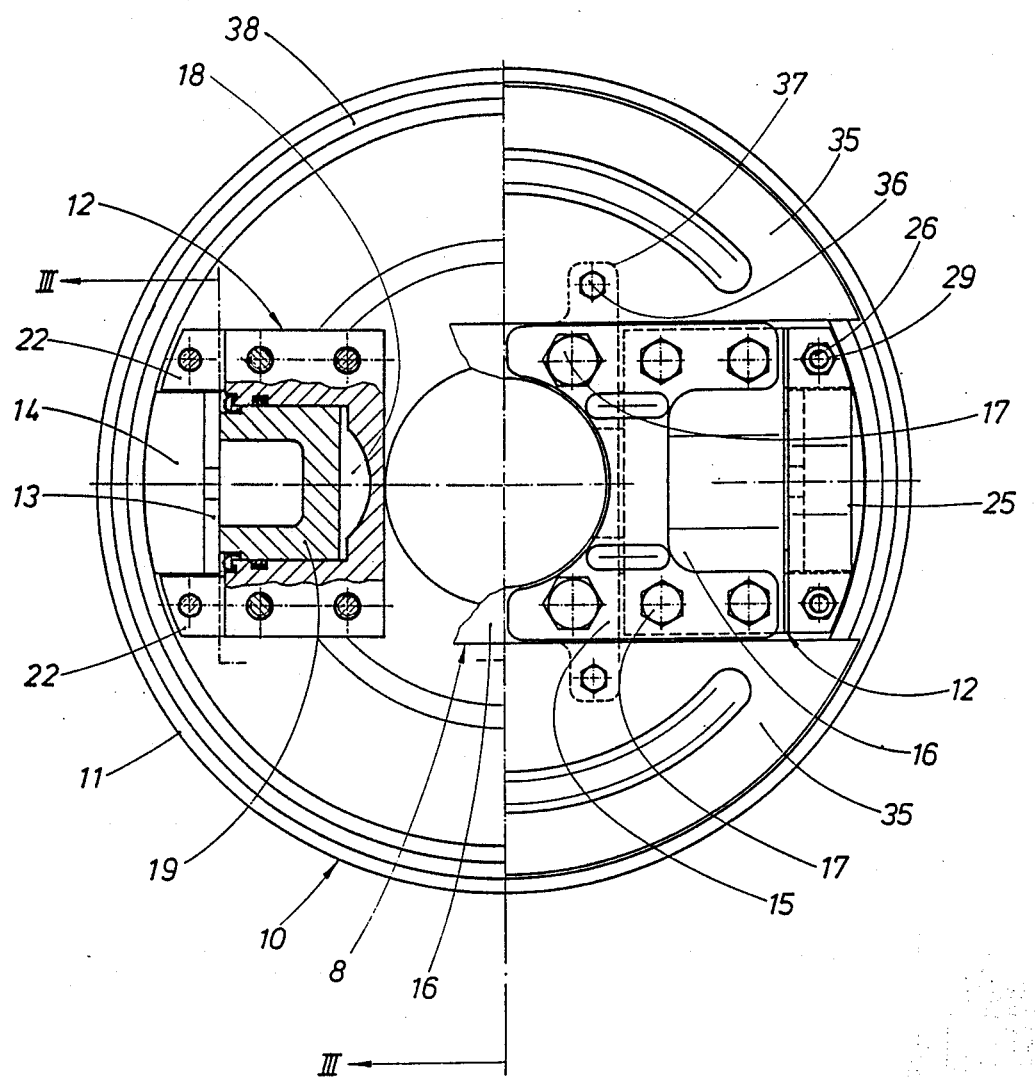
FIG. 2 is a view of the brake device of the arrangement of FIG. 1 as seen from the inner side of the wheel.
Figure 4:
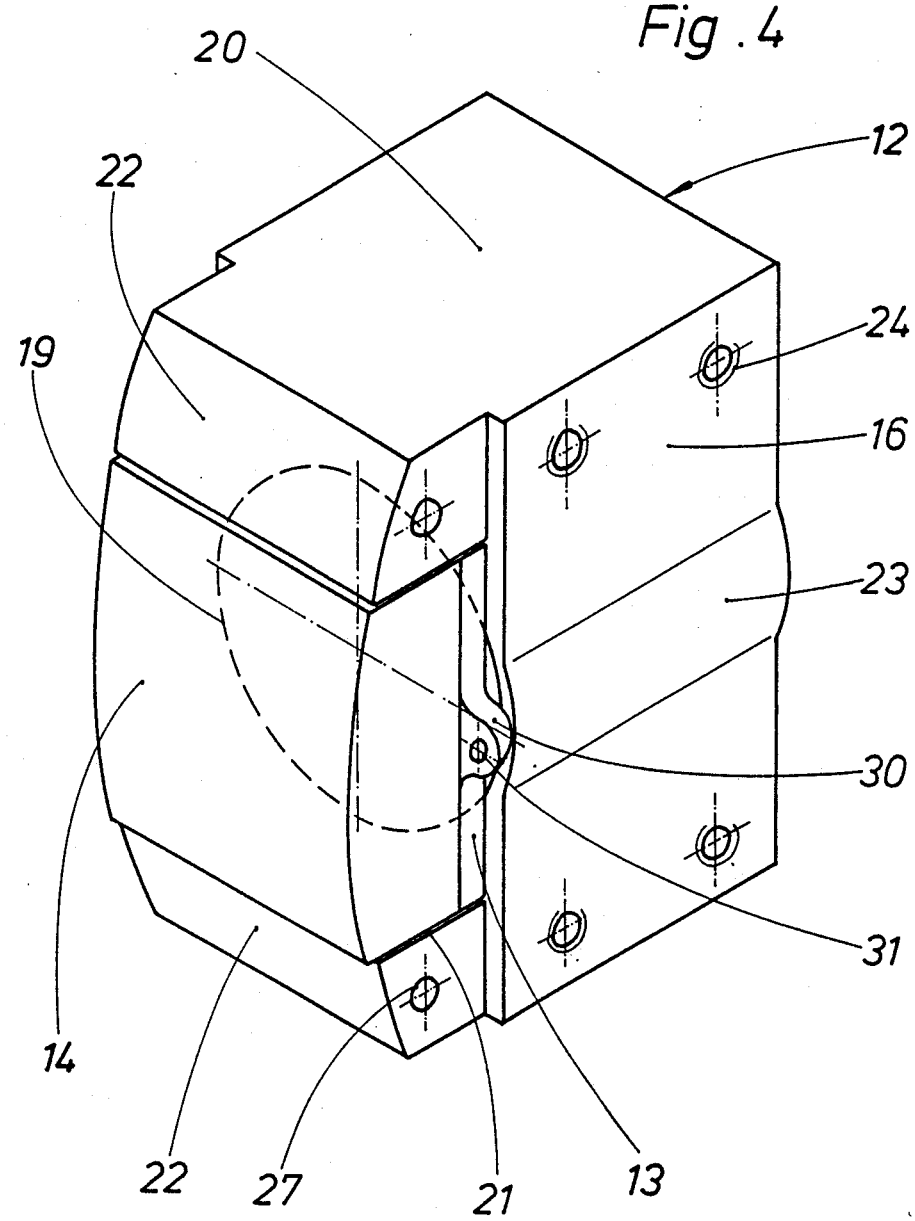
FIG. 4 is a perspective view of a brake guide saddle.

As may be best seen from the left hand side of FIG. 2, the brake guide saddles 12 each have a piston 19 able to be moved in a bore 18 by a fluid under pressure such piston engaging the respective brake element at the rear of the plate 13 which is thus pressed against the inner periphery of the drum casing 11. As may be best seen from FIG. 4 the brake guide saddles 12 each constitute a component which from the side appears like a letter U with a rear housing block 20 having the bore 18 therein and two guide lugs projecting 22 therefrom on the drum casing side and delimiting in the peripheral direction of the drum a guide channel 21 for the brake element consisting of the carrier plate 13 and the brake pad 14. In the illustrated working example of the invention the guide lugs 22 are placed adjacent to the upper and lower edges of the housing block 20 so that there is a large clearance width of the guide channel 21 and thus a correspondingly large width of the braking surface of the braking pad 14. The diameter of the bore 18 may be approximately equal to the clearance distance between the guide lugs 22 so that high pressing forces may be produced by the piston 19. In order to ensure a sufficient wall thickness between the two guide lugs 22 the housing block 20 may be curved in the form of a cylinder, as is indicated at 23 in FIG. 4. As will be seen on the right in FIG. 2 the retainer plate 15 has two limbs flanking the curved part 23. On the wheel support side the retainer plate 15 has two limbs as well with two through holes associated with the wheel axle 7 so that the result is more or less a H-like configuration of the retainer plates 15. FIG. 4 will also be seen to indicate the tapped holes 24 for the retaining screws 17 and which in the present case are arranged at the upper and lower edges of the housing block 20.

The brake elements including the carrier plate 13 and the brake pad 14 have their oppositely turned faces extending in the peripheral direction of the drum in engagement with the inner faces of the guide lugs 22. In order to guide the brake elements on all sides the mutually opposite guide lugs 22 have their oppositely facing end faces bridged over by ribs 25 which delimit the respective guide channel at the end, that is to say at the inner and outer sides of the wheel, this best being able to be seen from FIG. 3. The ribs 25, which may be in the form of pieces of sheet metal able to be engaged with the guide lugs 22 may be seen to define guide faces for the brake element perpendicular to the guide faces of the guide lugs 22 so that it is not possible for the brake element to drift out to the side, i. e. parallel to the guide lugs 22. This ensures that there is furthermore no lateral displacement of the brake element in relation to the associated piston 19 so that the pressure or force of the piston acts in the same manner on the brake element in every position thereof, as will also be seen from FIG. 3.

With the aid of the lateral ribs 25 the mutually opposite guide lugs 22 extending from the housing block 20 bear against each other so that the supporting forces occurring when braking takes place are transmitted to both the guide lugs. The frame design due to the use of the ribs 25 adjacent to the guide lugs 22 thus leads to a high degree of strength and rigidity. The pieces of sheet metal forming the ribs 25 are attached to the associated guide lugs 22 by means of screws 26 extending through the guide lugs 22. The latter are for this purpose provided with through holes 27 parallel to the tapped holes 24 of the housing block 20 as will be seen from FIG. 4. As will also be seen from FIG. 3 the retainer screws 26 are so placed that their heads 28 engage the outer rib 25 and have their threaded shanks extending through the inner rib 25 so that a nut 29, accessible from the inner side of the wheel, may be screwed on it. In the illustrated working embodiment of the invention the heads 28 of the screws 26 on the outer side of the wheel are countersunk for compactness. The piece of sheet metal respectively forming the outer rib 25 is for this purpose provided with a suitable recess. In order to replace a brake element it is only necessary to remove the piece of sheet metal forming the inner rib 25 by undoing the nuts 29 accessible from the inner side of the wheel. After this the brake element consisting of the carrier plate 13 and the brake pad 14 may be drawn off towards the inner side of the wheel. In order to facilitate this the carrier plate 13 is provided with a lateral grip bar 30, see FIGS. 3 and 4, on its edge on the inner side of the wheel. In the illustrated working example this bar is provided with a hole 31 to form an eye so that the brake element in question may be pulled off using a hook or the like towards the inner side of the wheel. The piece of sheet metal forming the rib 25 on the inner side of the wheel is, as may be seen from FIG. 3, provided with a corrugation 32 encompassing the grip bar so that one may be certain of full mobility of the brake element as driven by means of the respective piston.

Figure 3:
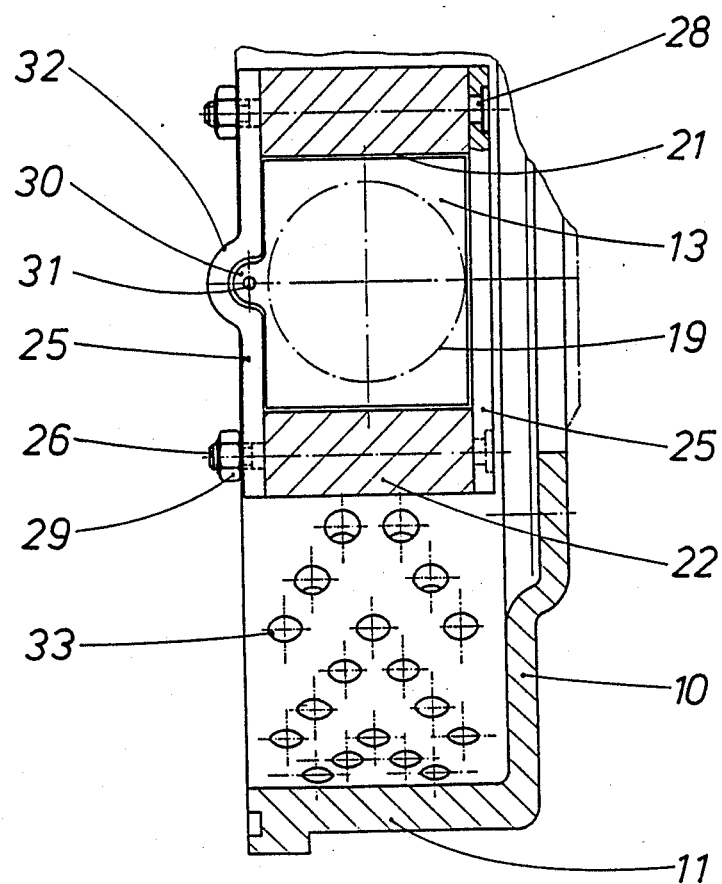
FIG. 3 is a section taken on the line III—III of FIG. 2.

As will further be seen from FIG. 3 the drum casing 11 of the brake drum 10 is provided with peripheral holes 33 serving for ventilation and for the escape of material worn off the brake pad. The holes 33 are in this respect so arrangement that there is a pattern of chevrons extending in the peripheral direction. The lateral forces produced owing to the holes 33 at the brake surface and directed across the peripheral direction cancel each other out. Accordingly when braking takes place the ribs 25 are not additionally loaded due to the lateral forces.

The brake guide saddles 12, which may be detachably mounted on the wheel carrier 8 have the rear side, turned away from the guide lugs 22, of their housing block 20 in engagement with the wheel support 8. The latter is accordingly provided with two oppositely facing support surfaces 34 arranged at the same level, as will be seen from FIG. 1, in which only the brake guide saddle 12 covered by the wheel support 8 is shown and the opposite brake guide saddle is omitted. The support surfaces 34 extend generally in parallelism to the wheel axle so that the respective brake guide saddle 12 may be removed in a direction towards the inner side of the wheel. To do this it is only necessary to remove the retainer plate 15 bridging over the joint gap between the wheel support 8 and the brake guide saddle 12, this being performed by undoing the retainer screws 17 accessible from the inner side of the wheel as has been indicated above.

The wheel support 8 and the brake guide saddle fitted thereto so as to bear on its lateral support surfaces 34, form, as may be seen from FIG. 2, practically a beam fitting through the center part of the inner cavity of the brake drum 10. Over and under this beam the cavity of the brake drum 10, see FIG. 2 on the right, is shut off by sheet metal covers 35 in the form of segments of circles. The latter may be attached by means of associated retainer screws 36 to cheekpieces 37 of the wheel support 8. In the illustrated example if the invention the drum casing 11 is provided with a circumferential channel 38 at its end towards the inner side of the wheel. The sheet metal covers 35 are accordingly provided at their circumferences with marginal lips 39 fitting into the channel 38, as will best be seen from FIG. 1. The chord-like edges of the sheet metal covers 35 bear on the wheel support 8 and on the brake guide saddles 12 projecting proud of this so that the interior space of the brake drum 10 and thus the complete brake device arranged therein is effectively shut off from the outside.

Although a preferred embodiment of the invention has been explained above in detail, this is not to be construed as limiting the scope of the invention in any way.

I claim:

1. A brake arrangement comprising a wheel support, a wheel borne by said wheel support, a brake drum, at least one brake guide saddle arranged in the brake drum so as to bear against the wheel support, a fluid drive piston arranged in a bore in said guide saddle, said guide saddle having guide lugs extending in a direction parallel to the direction of the bore, said lugs delimiting a channel in the peripheral direction, a brake element placed in the channel so it is capable of being driven by said piston, said at least one brake guide saddle being separate from the wheel support, retainer elements, which are accessible from the inner side of the wheel, detachably connecting the guide saddle with the wheel support, and at their longitudinal sides the guide lugs each delimiting such guide channel are bridged over at their longitudinal sides by ribs delimiting the guide channel at the end, such ribs being detachably secured by retainer elements accessible from the inner side of the wheel, and on the inner side of the wheel each brake element has a grip bar encompassed by the respective rib.

2. The brake arrangement as claimed in claim 1 wherein said brake guide saddle and said wheel support have mutually aligned bearer surfaces turned towards the inner side of the wheel for at least one retainer plate bridging over a joint gap between the brake guide saddle and the wheel support.

3. The brake arrangement as claimed in claim 2 wherein said retainer plate has a H-like configuration.

4. The brake arrangement as claimed in claim 1 wherein the brake guide saddle has a rear side thereof bearing against an associated bearer surface on the wheel support.

5. The brake arrangement as claimed in claim 1 wherein the grip bar is formed on a carrier plate.

6. The brake arrangement as claimed in claim 1 comprising sheet metal covers in the form of segments of circles adapted to be detachably secured to the wheel support to cover over the brake drum outside a beam formed by wheel support and the brake guide saddle arrangement.

7. The brake arrangement as claimed in claimed in claim 6 wherein at its end side turned towards the inner side of the wheel the brake drum has a circumferential channel into which marginal lips of the sheet metal covers fit.

8. The brake arrangement as claimed in claim 1 wherein the retainer elements associated with the ribs take the form of screws fitting through respective holes in the guide lugs and which have heads engaging the rib turned towards the outer side of the wheel and which bear against the rib turned towards the inner side of the wheel by way of a nut screwed on their screw threaded shanks.

9. The brake arrangement as claimed in claim 1 wherein the retainer elements associated with the brake guide saddle are in the form of screws adapted to be screwed into associated tapped holes.

10. The brake arrangement as claimed in claim 1 wherein said brake guide saddle is in the form a generally U-like component with a housing block having the bore for the piston and limbs extending therefrom at the drum periphery, such limbs forming the guide lugs.

11. The brake arrangement as claimed in claim 1 wherein the brake drum is provided with peripheral holes in its casing, such holes being arranged in a chevron pattern pointing in the peripheral direction.

12. The brake arrangement as claimed in claim 1 adapted for use with a motor vehicle, and wherein said brake element comprises a brake pad and a carrier plate therefor, the grip bar is provided with a hole, and wherein the retainer elements are formed by screws with countersunk heads.

* * * * *